March 16, 1937.  E. L. CLAIR  2,074,164
METALLURGICAL APPARATUS AND PROCESS
Filed June 17, 1935   2 Sheets-Sheet 1

Inventor:
Edward L. Clair.
By Brown, Jackson, Boettcher + Dienner
Attys.

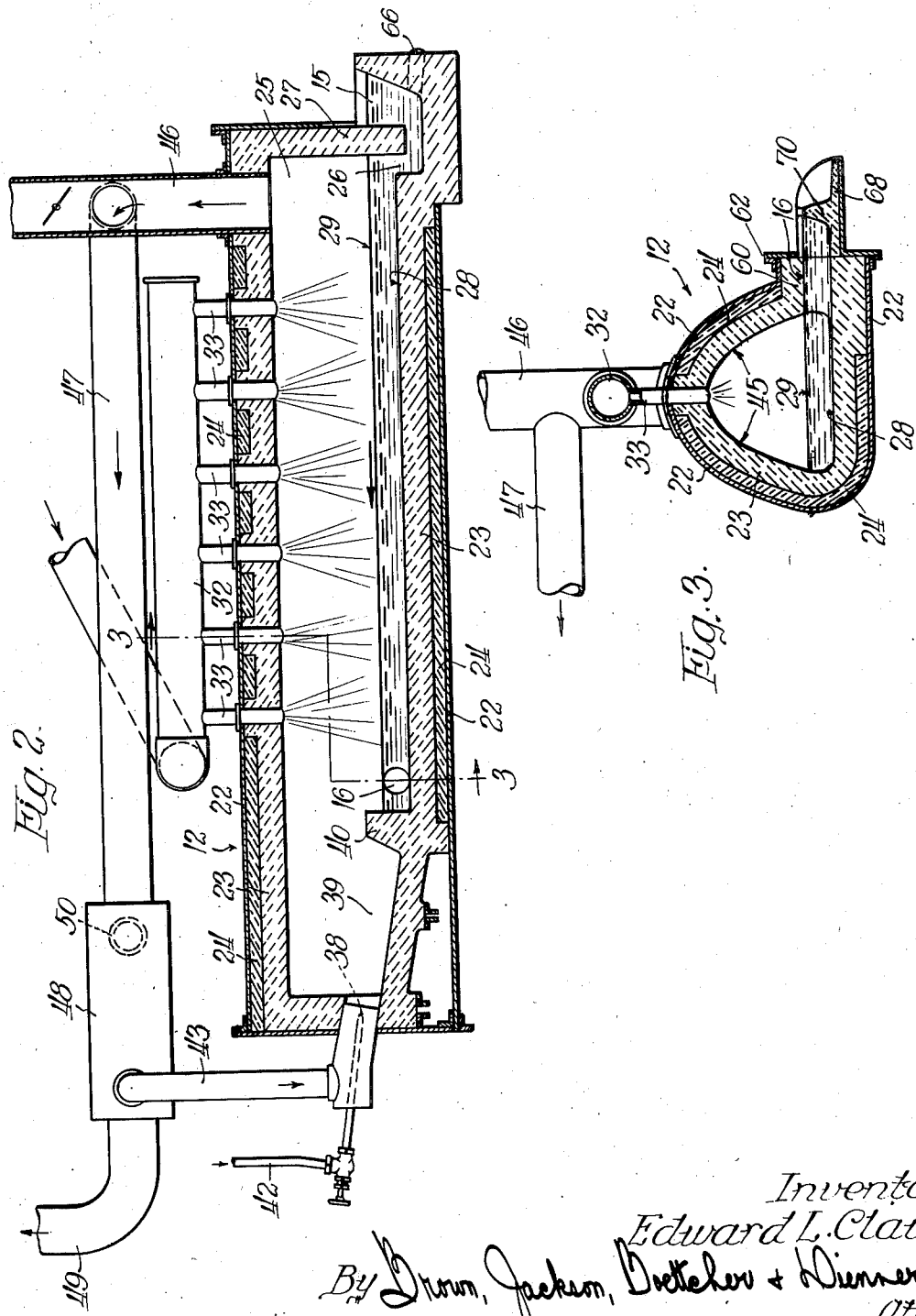

Patented Mar. 16, 1937

2,074,164

UNITED STATES PATENT OFFICE 2,074,164

METALLURGICAL APPARATUS AND PROCESS

Edward L. Clair, Toledo, Ohio, assignor to Interlake Iron Corporation, Chicago, Ill., a corporation of New York Application June 17, 1935, Serial No. 26,927

10 Claims. (Cl. 75—60)

My invention relates to a metallurgical apparatus and process and, more particularly, to a metallurgical apparatus and process to be used for the purpose of producing low carbon pig iron and for the purpose of producing iron in which the carbon content is reduced in particle size and more uniformly distributed throughout the body of the iron.

The production of pig iron in a typical iron blast furnace results in a type of pig iron containing approximately a total of 4% of carbon and in an iron having relatively large particles or segregations of carbon disposed unevenly throughout the body of the iron.

It is an object of the present invention to provide an improved metallurgical apparatus and process for continuous treatment of the hot metal after it leaves the blast furnace to reduce the carbon content below that possible in the usual or typical blast furnace.

It is another object of the present invention to provide an improved apparatus and process for reducing the particle size of the carbon content of the iron and for bringing about a much more uniform and better distribution of the smaller particles of carbon throughout the body of the iron.

The reduction in particle size of the carbon content and the more uniform distribution of the reduced carbon particles result in a more stable, more uniform, and much stronger iron, and the reduction in the carbon content further improves the stability, uniformity and strength of the iron.

The process of the present invention consists in passing the hot molten pig-iron from the blast furnace in a continuous stream after it leaves the blast furnace, directing a reducing gas which will react with and reduce the carbon content of the molten iron downward and into direct contact with the continuous stream of molten pig-iron. Because this operation will cause the molten iron to lose temperature, I simultaneously apply heat, preferably independently of the reducing gas to maintain the iron at a temperature at least as high as the temperature at which it enters the reducing process for treatment.

The apparatus may be in the form of a superheating and/or carbon reducing furnace having a generally horizontal chamber provided with an inlet for the hot metal and an outlet arranged for continuous passage of the hot metal along the bottom of the chamber from the inlet to the outlet in a relatively shallow stream, with an upper surface of relatively great area. The inlet may be charged with hot metal from the blast furnace, and the outlet may pass the processed metal directly to the pig iron molding or casting machine.

Where a carbon reducing atmosphere is employed, this atmosphere is obtained by passing a carbon reducing gas down through the top of the reducing chamber and upon the upper surface of the stream of hot metal. This reducing gas may be carbon dioxide ($CO_2$), the product of combustion resulting from combustion of blast furnase gas, or some other gaseous fuel which will give a product relatively high in $CO_2$ and relatively low in CO, or in which CO is entirely absent, depending upon the efficiency of the combustion, or any other gas which will react with and reduce the carbon in the metal.

The heat which is applied preferably heats the metal sufficiently to bring its solubility for carbon substantially higher than as cast from the blast furnace. The particle size of the carbon content is reduced, and the carbon particles of reduced size are distributed more uniformly throughout the body of the iron. At the same time, the heat which is applied prevents cooling of the metal to thickened or pasty condition by the reaction of the reducing gas with the carbon content of the hot metal.

To insure the highest efficiency of heat transfer from the fuel to the metal, the invention further provides for transferring, as by means of a regenerator, recuperator, or other suitable device, the heat of the waste gases from the superheating and/or carbon reducing chamber to the air supply for the burner which applies the heat to the stream of hot metal during the continuous processing of the same.

Another feature of the present invention resides in forming the bottom of the carbon reducing chamber in a manner to obtain relatively great contact between the carbon reducing gas and the hot metal, and in forming the top and sides of said chamber in a manner to obtain effective reflection of the heat upon the hot metal.

Another feature of the invention resides in the provision of an improved hot metal seal for the inlet to the carbon reducing chamber.

Further features and the advantages and details of the illustrated embodiment of the invention will be apparent from the following detailed description taken in connection with the accompanying drawings, in which:

Figure 2 is a longitudinal vertical sectional view through the carbon reducing furnace for treating the hot metal after it leaves the blast furnace, taken on the line 2—2 of Figure 1; and Figure 3 is a transverse section taken on the line 3—3 of Figure 2.

Figure 1:
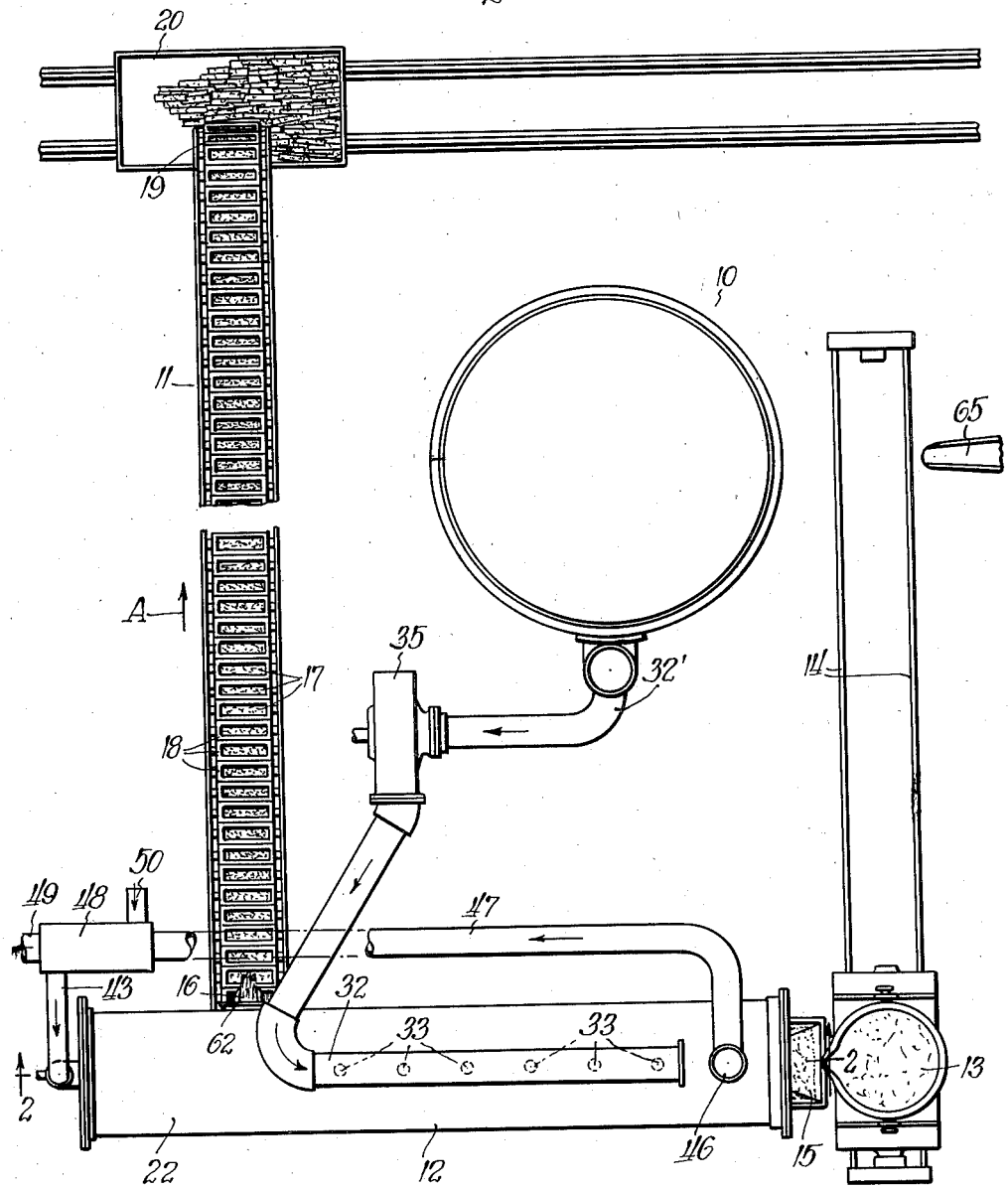
Figure 1 is a more or less diagrammatic plan view showing an embodiment of the present invention.

In Figure 1 of the drawings, a spout is indicated at 65 for tapping the metal in molten condition at or near the bottom of the blast furnace (not shown). The blast furnace may be any typical or preferred iron blast furnace. A blast furnace stove for burning the blast furnace gas or some other gas fuel which will give a product relatively high in $CO_2$ and relatively low in CO, or in which CO is entirely absent, is indicated at 10. A pig molding or casting machine is indicated at 11. This molding machine 11 may be of the usual or any suitable or preferred type such, for example, as the type more fully disclosed in my copending application, Serial No. 11,410, filed March 16, 1935.

The apparatus of the present invention comprises a furnace, designated in its entirety at 12, for continuous after-treatment of the hot metal from the iron blast furnace. The furnace 12 is charged with the hot metal in liquid form from the blast furnace by means of a ladle 13 which may operate upon tracks 14 and pours the molten metal into the spout, whence it overflows into the inlet 15 at one end of the furnace 12.

The molten iron which is processed continuously in the furnace 12, as will hereinafter more fully appear, passes through this furnace in a continuous stream and leaves through a tapping hole 16. The hole 16 delivers the hot processed metal into the hollow metallic molds 17 as they travel slowly past in the direction indicated by the arrow A. The molds 17 are carried in a continuous series on an endless conveyor or chain 18 trained at its opposite ends over sprockets, as well understood in the art.

By the time the iron reaches the other or head end 19 of the machine 11, it consists of solid pigs of iron which may drop into the waiting railroad car 20 as the chain or conveyor 18 passes over the sheave at the head end of the machine. The pig iron is then in a form convenient for transportation or storing until needed. The molds 17 travel back toward the spout or pouring end of the machine 11 underneath the machine, and with their hollow or open sides directed downwardly. They may be provided in their travel back to the pouring end with a coating of suitable material, such as lime, to which the melted iron will not stick.

The furnace 12 has a steel shell 22 provided with a refractory lining 23. A layer of insulation 24, such as asbestos or the like, is disposed between the lining 23 and the shell 22. The lining 23 forms the walls of a generally horizontal and relatively elongated chamber 25. The inlet 15 opens at 26 into one end of this chamber 25, and the inlet 15 and outlet 16 are arranged for a continuous passage of the hot metal along the bottom of the chamber in a shallow, relatively flat, stream, with an upper surface of relatively great area. The refractory end wall 27 closes the adjacent end of the chamber 25, and the lower end of this wall 27 preferably extends down below the bottom 28 of the chamber 25 to form an iron seal at the inlet to the chamber. The bottom 28 of the chamber is preferably flat, and the chamber is preferably of about its maximum width at the bottom, as shown in Figure 3, so that with the close proximity of the tapping hole 16 to the bottom of the chamber, the hot metal will pass through the chamber in a shallow stream having an upper surface 29 of relatively great area, as already pointed out.

Where a carbon reducing atmosphere is employed in the furnace 12, carbon reducing gas is delivered under pressure from a pipe 32 and through tuyères 33 down through the top of the furnace 12 and upon the upper surface 29 of the stream of hot metal. The reducing gas may be carbon dioxide ($CO_2$), the product of combustion resulting from combustion of blast furnace gas or some other gaseous fuel which will give a product relatively high in $CO_2$ and relatively low in CO, or in which CO is entirely absent, or any gas that will react with and reduce the amount of carbon contained in the metal. As already set forth, the use of air is contemplated within the scope of the broader aspects of the present invention, although air will react with or attack the silicon content of the metal before the desired reaction with the carbon content is obtained, and therefore should be avoided where it is not desired to reduce the silicon content. With carbon dioxide ($CO_2$), the product of combustion resulting from combustion of blast furnace gas or some other gaseous fuel which will give a product relatively high in $CO_2$ and relatively low in CO, or in which CO is entirely absent, the desired carbon reduction may be obtained without reducing the silicon content of the hot metal.

In the illustrated embodiment of the invention, the pipe 32 is connected to the offtake or stack 32′ from the blast furnace stove 10, and is provided with a blower 35 to deliver the gas into the chamber 25 under suitable pressure for obtaining the desired rate of carbon reduction. The stack gas from the blast furnace stove 10 contains approximately 25% carbon dioxide ($CO_2$), and therefore is admirably suited for the purposes of the present invention. The pressure under which the reducing gas is delivered into the furnace 12, as well as the number of tuyères 33 and the length of the chamber 25, may be varied to vary the time and amount of contact of the reducing gases with the hot metal in its passage through the furnace 12.

For the purpose of heating the chamber 25, the furnace 12 is provided with a suitable burner 38. This burner 38 is directed obliquely inwardly and downwardly into a combustion chamber 39 at the end of the furnace 12 opposite the end at which the inlet 15 is disposed. An upstanding wall 40, integral with the lining 23, forms the adjacent end of the portion of the chamber through which the hot metal passes, and may act also in the manner of a baffle toward which the burner 38 is directed. The chamber 39, which is in the nature of a combustion chamber, is tapered toward the wall 40 for the expansion which takes place in the combustion of the fuel.

The fuel for the burner 38 may be oil, gas, or powdered coal, coke, or the like. In the illustrated embodiment of the invention, suitable gas is delivered, under pressure, to the burner 38 by means of a pipe 42, and air is supplied to the burner by means of a pipe 43. Where a gas burner is employed, as shown, it may be of any suitable or preferred form, and the gas and air supply lines may be controlled as desired.

The top and sides of the chamber 25 are preferably of parabolic form, as shown at 45, to provide parabolic reflection of the heat upon the hot metal in its passage through the chamber 25. The particular form of the chamber may, however, be varied within the scope of the appended claims.

The heat applied by the burner 38 keeps the hot metal in liquid condition and against cooling to a thickened condition by the reaction of the reducing gases with the carbon in the metal. And this heat preferably superheats the iron after it leaves the blast furnace to a temperature which will bring the solubility of the molten pig-iron for carbon substantially higher than as cast from the blast furnace, and acts to maintain the iron throughout the reducing process at a temperature at least as high as the temperature at which it enters the reducing process for treatment. This superheating action reduces the particle size of the carbon content of the iron and brings about a much more uniform and better distribution of the smaller particles of carbon throughout the body of the iron and the reduction in the carbon content further improves the stability, uniformity and strength of the iron.

The waste products from the chamber 25 are discharged through a stack or offtake 46. This stack 46 is shown as connected by a pipe 47 to a regenerator or recuperator 48 which is provided with the waste gas outlet 49. This regenerator or recuperator 48 serves to heat the intake air which enters the regenerator or recuperator 48 through the pipe 50 and goes from the regenerator or recuperator through the pipe 43 to the burner 38. Regenerators and recuperators per se are well known in the art, and it is not believed that a detailed description of the same is necessary here. Suffice it to say that the device 48 may be either a regenerator or a recuperator, or any other equivalent device for the transfer of heat from the waste gases from the chamber 25 to the air-line for the burner 38.

The stack 46 also has an outlet to atmosphere which may be normally closed to provide a closed circulation through the chamber 45, stack 46, pipe 47, regenerator or recuperator 48, pipe 43, burner 38, and chamber 39, or it may be arranged to be normally open to atmosphere so that a portion only of the waste gases will pass through the regenerator or recuperator to heat the supply of air for the burner. The tapping hole or outlet 16 from the chamber 25 extends laterally from the bottom of the chamber in proximity to the end remote from the inlet 15, and through a lateral boss portion 60 formed integral with the refractory lining 23 and provided with a steel shell covering at 62. The spout 68 may have a dam 70 for holding the desired level of molten iron in the furnace 12.

In the operation of the apparatus, the metallic ore is smelted in the blast furnace in contact with fuel and flux, the combustion of the fuel being accelerated by air under pressure, all in the usual or any suitable or preferred manner. The metal is tapped in molten condition at 65 at or near the bottom of the furnace from where it may be transferred, as by means of the ladle 13, to the inlet 15 of the carbon reducing or processing furnace 12. The inlet 15 may have a drain opening at 66.

The hot metal passes through the bottom of the chamber 25 in a continuous stream, rising to approximately the level indicated in Figure 2, and is delivered through the tapping hole 16 to the pig casting or molding machine 11. In the passage of the hot metal through the chamber 25, it is superheated in the manner and with the advantages already disclosed, and the carbon reducing gas is continuously blown in through the tuyères 33 and down upon the upper surface 29 of the shallow stream of hot metal. This gas reacts with and reduces the carbon content of the hot metal, converting the carbon dioxide ($CO_2$), reducing gas, or the carbon dioxide ($CO_2$) portion of the reducing gas, to carbon monoxide (CO), as follows:

$$CO_2 \text{ plus } C = 2CO.$$

The waste gas, the carbon monoxide portion of which may be reconverted to carbon dioxide, is discharged through the stack 46 and, as already explained, the heat thereof may be transferred, by means of a regenerator, recuperator, or other device 48, to the air supply for the burner 38 for the purpose of heating the same. The heat applied to the stream of hot metal by the burner 38 provides, in effect, a superheating action for maintaining the metal in liquid form and against cooling to thickened condition by the reaction between the reducing gas and the free carbon content of the hot metal.

I do not intend to be limited to the precise details shown or described.

I claim:

1. A process for reducing the carbon content in pig iron and producing a low carbon pig-iron in which the carbon content of the iron is reduced in particle size and more uniformly distributed throughout the body of the iron which comprises passing the hot molten pig-iron from the blast furnace in a continuous stream after it leaves the blast furnace, directing a reducing gas which will react with and reduce the carbon content of the molten iron downward upon and into direct contact with the continuous stream of molten pig-iron and simultaneously applying heat independently of said reducing gas to maintain the iron at a temperature at least as high as the temperature at which it enters the reducing process for treatment.

2. A process for reducing the carbon content in pig-iron and producing a low carbon pig-iron in which the carbon content of the iron is reduced in particle size and more uniformly distributed throughout the body of the iron which comprises passing the hot molten pig iron from the blast furnace in a continuous stream after it leaves the blast furnace, directing a gas relatively high in $CO_2$ downward upon and into direct contact with the continuous stream of molten pig-iron, and simultaneously applying heat upon and into direct contact with the continuous stream of molten pig-iron to reduce the carbon content of the stream of pig-iron, and simultaneously applying heat independently of said carbon reducing gas to maintain the iron at a temperature at least as high as the temperature at which it enters the reducing process for treatment.

3. A process for reducing the carbon content in pig-iron and producing a low carbon pig iron in which the carbon content of the iron is reduced in particle size and more uniformly distributed throughout the body of the iron, which comprises passing the hot molten pig-iron from the blast furnace in a continuous stream after it leaves the blast furnace, directing products of combustion resulting from combustion of blast furnace gas downward upon and into direct contact with the continuous stream of molten pig-iron to reduce the carbon content of said stream of pig-iron, and simultaneously applying heat independently of said products of combustion resulting from combustion of blast furnace gas to maintain the iron at a temperature at least as high as the temperature at which it enters the reducing process for treatment.

4. A process for reducing the carbon content in pig-iron and producing a low carbon pig-iron in which the carbon content of the iron is reduced in particle size and more uniformly distributed throughout the body of the iron, which comprises passing the hot molten pig iron from the blast furnace in a continuous stream after it leaves the blast furnace, directing a reducing gas which will react with and reduce the carbon content of the molten iron downward upon and into direct contact with the continuous stream of molten pig iron, directing air and fuel into position at the end only of the reducing process and out of contact with the stream of molten pig-iron and the reducing gas, and burning same to apply simultaneously with and independently of said reducing gas heat to maintain the iron at a temperature at least as high as the temperature at which it enters the reducing process for treatment.

5. A process for reducing the carbon content in pig-iron and producing a low carbon pig iron in which the carbon content of the iron is reduced in particle size and more uniformly distributed throughout the body of the iron, which comprises passing the hot molten pig iron from the blast furnace in a continuous stream after it leaves the blast furnace, directing a reducing gas which will react with and reduce the carbon content of the molten iron downward upon and into direct contact with the continuous stream of molten pig iron, directing air and fuel from a burner into position at the end only of the reducing process and out of contact with the stream of molten pig iron and the reducing gas, burning same to apply simultaneously with and independently of said reducing gas heat to maintain the iron at a temperature at least as high as the temperature at which it enters the reducing process for treatment, and applying reducing heat from the waste products from the reducing process to the air supply for said burner.

6. A pig iron refining chamber having an inlet for receiving molten iron from a blast furnace and an outlet for discharging hot refined pig-iron in a continuous process, the inlet and outlet of said chamber being arranged for continuous passage of the hot metal along the bottom of the reducing chamber from the inlet to the outlet in a shallow flat stream with an upper surface of relatively great area, means for passing through the top of said chamber and down upon the stream of hot metal a reducing gas which will react with and reduce the amount of carbon contained in the pig-iron, and a burner directed into said chamber beyond the end of the stream of hot metal opposite the inlet for applying heat to maintain the hot metal at a temperature at least as high as the temperature at which the molten pig iron from the blast furnace enters the refining chamber.

7. A pig iron refining chamber having an inlet for receiving molten iron from a blast furnace and an outlet for discharging hot refined pig-iron in a continuous process, the inlet and outlet of said chamber being arranged for continuous passage of the hot metal along the bottom of the reducing chamber from the inlet to the outlet in a shallow flat stream with an upper surface of relatively great area, means for passing through the top of said chamber and down upon the stream of hot metal a reducing gas which will react with and reduce the amount of carbon contained in the pig-iron, a burner of carbon contained in the pig-iron, a burner directed into said chamber beyond the end of the stream of hot metal opposite the inlet for applying heat to maintain the hot metal at a temperature at least as high as the temperature at which the molten pig iron from the blast furnace enters the refining chamber, and a baffle separating the stream of molten pig iron in the refining chamber from said burner.

8. A pig-iron refining chamber having an inlet for receiving molten pig-iron from a blast furnace and an outlet and adapted for passing the molten pig iron in a continuous stream from said inlet to said outlet, means for passing a reducing gas which will react with and reduce the carbon content of the molten iron downward through the top of said chamber and into direct contact with the continuous stream of molten pig-iron, and means for simultaneously applying heat independently of said reducing gas to maintain the iron at a temperature at least as high as the temperature at which it enters the reducing chamber.

9. A pig-iron refining chamber having an inlet for receiving molten pig iron from a blast furnace and an outlet and adapted for passing the molten pig-iron in a continuous stream from said inlet to said outlet, means for passing a reducing gas which will react with and reduce the carbon content of the molten iron downward through the top of said chamber and into direct contact with the continuous stream of molten pig iron, a burner for simultaneously applying heat independently of said reducing gas to maintain the iron at a temperature at least as high as the temperature at which it enters the reducing chamber, a baffle separating the stream of molten pig-iron from said burner, and a refractory end wall extending down below the bottom of the refining chamber at the inlet end thereof and forming a hot metal seal for the refining chamber.

10. A process for reducing the carbon content in pig iron and producing a low carbon pig iron in which the carbon content of the iron is reduced in particle size and more uniformly distributed throughout the body of the iron, which comprises passing the hot molten pig iron from the blast furnace in a continuous stream after it leaves the blast furnace, subjecting the continuous stream of molten pig iron to direct contact with a reducing gas which will react with and reduce the carbon content of the molten iron and simultaneously applying heat independently of said reducing gas to maintain the iron at a temperature at least substantially as high as the temperature at which it enters the reducing process for treatment.

EDWARD L. CLAIR.